United States Patent
Goodson (10) Patent No.: US 10,119,640 B2
(45) Date of Patent: Nov. 6, 2018

(54) APPARATUS AND METHOD FOR A PLUMBING CONNECTOR

(71) Applicant: Mark E Goodson, Corinth, TX (US)

(72) Inventor: Mark E Goodson, Corinth, TX (US)

( * ) Notice: Subject to any disclaimer, the term of this patent is extended or adjusted under 35 U.S.C. 154(b) by 33 days.

(21) Appl. No.: 15/442,021

(22) Filed: Feb. 24, 2017

(65) Prior Publication Data
US 2017/0214185 A1    Jul. 27, 2017

Related U.S. Application Data

(63) Continuation-in-part of application No. 15/414,833, filed on Jan. 25, 2017, now abandoned.

(60) Provisional application No. 62/287,327, filed on Jan. 26, 2016.

(51) Int. Cl.
| | |
|---|---|
| *H05F 3/00* | (2006.01) |
| *F16L 25/01* | (2006.01) |
| *H01R 4/66* | (2006.01) |
| *H01R 4/36* | (2006.01) |
| *H01R 4/56* | (2006.01) |
| *H01R 11/09* | (2006.01) |

(52) U.S. Cl.
CPC ............... *F16L 25/01* (2013.01); *H01R 4/66* (2013.01); *H01R 4/36* (2013.01); *H01R 4/56* (2013.01); *H01R 11/09* (2013.01)

(58) Field of Classification Search
CPC .............................. H01R 13/648; F16L 25/01
USPC ........................................................ 361/215
See application file for complete search history.

(56) References Cited

U.S. PATENT DOCUMENTS

| | | | | |
|---|---|---|---|---|
| 4,106,832 A | * | 8/1978 | Burns | ....... H01R 4/64 439/100 |
| 4,878,696 A | * | 11/1989 | Walker | ....... F16L 3/2235 285/143.1 |
| 5,480,311 A | * | 1/1996 | Luu | ....... H01R 4/643 439/100 |

* cited by examiner

*Primary Examiner* — Thienvu Tran
*Assistant Examiner* — Lucy Thomas (57) ABSTRACT

The present invention provides an apparatus for a threaded plumbing connector to electrically ground pipes. The apparatus includes wire terminal block(s), connecting the threaded plumbing connector body to a wire or other conductive material. In the event that a pipe becomes electrically energized, the grounding connection of the threaded plumbing connector would be able to shunt the electrical current away from the pipes and reduce the risk of fire.

30 Claims, 10 Drawing Sheets

APPARATUS AND METHOD FOR A PLUMBING CONNECTOR

CROSS-REFERENCE TO RELATED APPLICATIONS

This application is a continuation in part of U.S. application Ser. No. 15/414,833, filed Jan. 25, 2017, which claims the benefit of U.S. Provisional Application No. 62/287,327, filed Jan. 26, 2016, the disclosure of which is fully incorporated herein by reference.

BACKGROUND

1. Field of the Disclosure

The present invention relates generally to the prevention of fires caused by electrical energy and more specifically to fires involving gas leaks at the fittings and junctions between gas lines or other plumbing connections.

2. Background

In a world that relies on electronics and electrical systems, providing a reliable ground throughout a building is critical. A reliable ground connection is especially critical for static electricity buildup along gas pipelines. While, some buildings use their plumbing systems to provide one path for non-critical grounding, other buildings do not have any ground connection for their plumbing fixtures. Moreover, due to plumbing fittings requiring Teflon tape or plumbers putty to properly fit the plumbing connection, the conductivity between two pipes can be further reduced. Materials such as, Teflon tape and plumbers putty are low conductivity materials, preventing them from transferring an electric current from one pipe to the next.

Enter Corrugated Stainless Steel Tubing (CSST), a corrugated pipe that is flexible and in most cases easier to install over traditional black iron pipe. With sizes ranging from one-half of an inch up to two inches, CSST is one of the most popular pipes for residential gas lines. There is a drawback of the corrugated nature of CSST. Its thin walls cause it to have a propensity to fail in lightning storms, allowing the escape of fuel gas. An arc to the CSST surface can develop, and this arc can result in the CSST being punctured, and thus creating a high fire risk situation. To help reduce the risks of electrical energy from storms puncturing CSST, the National Fuel Gas Code now requires a so called "direct bond" to the CSST piping; the bond wire is a heavy gauge bond wire, and is connected to the building grounding system.

On some piping systems, a jumper wire is used to jump or connect the ground from one pipe material to a different pipe material. The current method of attaching a jumper wire to the pipe requires attaching a screw on clamp to the pipe. To ensure a solid connection any paint or other non-metallic material on the outer surface of the pipe must be removed. Additional problems have been created with the introduction of CSST. The grooves along the outer surface of CSST, that aid in the flexibility of the pipe, also reduce the available surface area for unshielded CSST pipes. Some CSST installers address this issue by placing the clamp around a pipe junction. However, employing the clamp around the pipe-fitting still creates an issue of minimal surface area. This creates a problem with traditional clamps because the physical connection can be lost when the clamp loosens even the slightest amount and the minimal surface area is lost.

BRIEF SUMMARY

In accordance with one embodiment, a threaded plumbing connector is presented. The threaded plumbing connector allows a bonding wire to be connected to the grounding system without the use of the traditional bonding clamp.

In accordance with one aspect of the present invention, an apparatus for a threaded plumbing connector includes a hollow passage body, a first threaded end, a second threaded end, a geometric outer body surface between the two threaded ends, and a wire terminal block. The wire terminal block allows the attachment of a conductive wire, to shunt electrical current away from the plumbing connector.

DETAILED DESCRIPTION

The present disclosure describes a threaded plumbing connector. Such a threaded plumbing connector creates an interface between two different fluid lines or pipes, and provides an electrical terminal connection to shunt away unwanted current. In particular, for gas lines, employing the threaded plumbing connector reduces the fire risk, resulting from high electrical current traveling along the gas line. For example, a high current spike from a lightning strike or a short in an electrical power system.

Figure 1A:
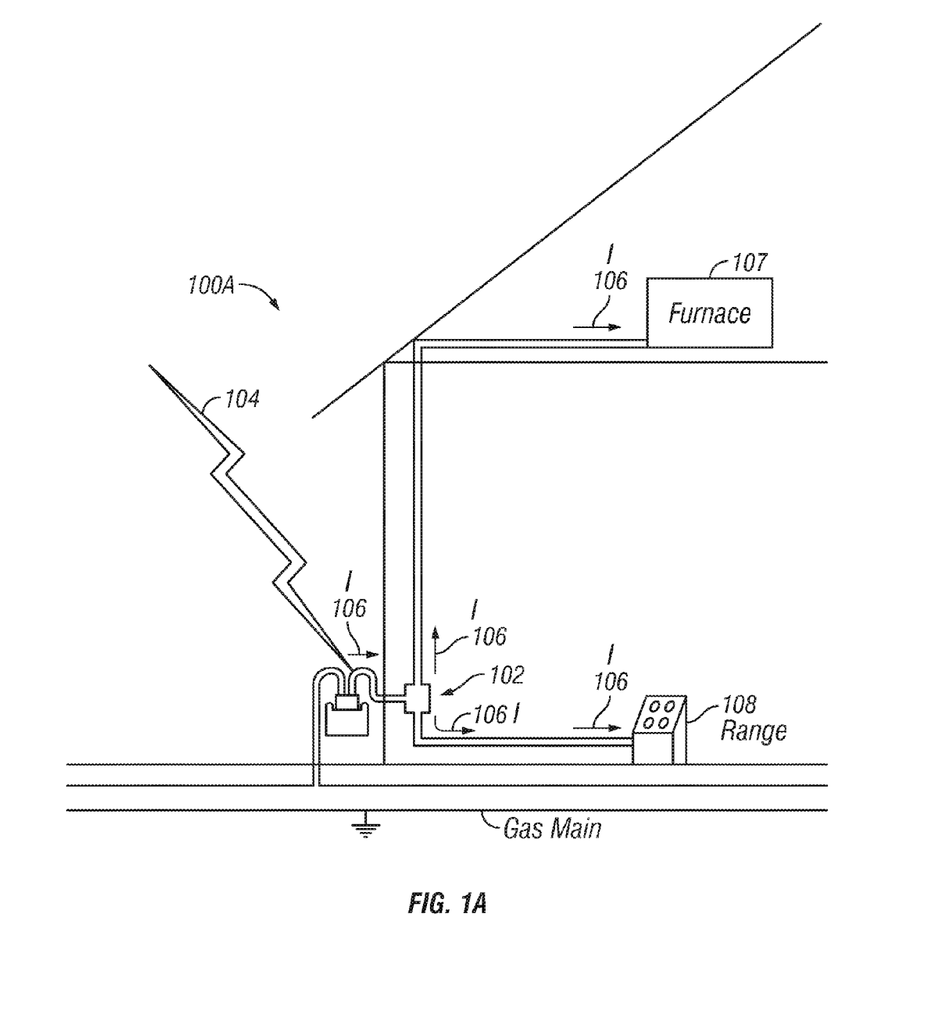
FIG. 1A shows a house without gas line protection struck by lightning.

FIG. 1A shows a house 100A that has been struck by lightning 104 that did not have grounding protection for its gas line system 102. The current from the lightning strike 106 can travel along the entire gas line system 102. This current 106 is a major fire risk, and is especially dangerous if there are any junction failures. High currents can arc (jump) across these failures creating a spark that can be the source of ignition for a devastating fire. Additionally there is risk to appliances such as a furnace 107 or a range 108.

Figure 1B:
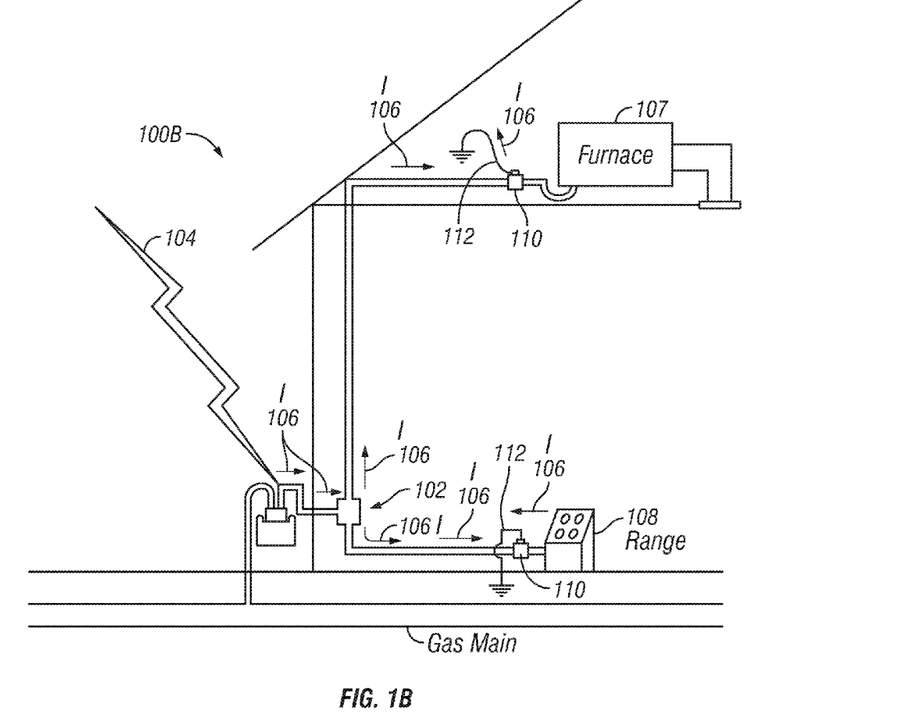
FIG. 1B shows a house with the plumbing fitting gas line protection struck by lightning.

In FIG. 1B the gas system 102 of a house 100B, is outfitted with the threaded plumbing connector 110. The threaded plumbing connector 110 creates a low resistance, high conductivity interface between pipes, including pipes of different materials. The low resistance and high conductivity allow the threaded plumbing connector 110, in conjunction with a conductive wire 112 to shunt current away from the pipes to a building ground. Not only does shunting reduce the risk of fire in the gas system 102, it also protects appliances from high currents as well (see furnace 107 or range 108).

Figure 2A:
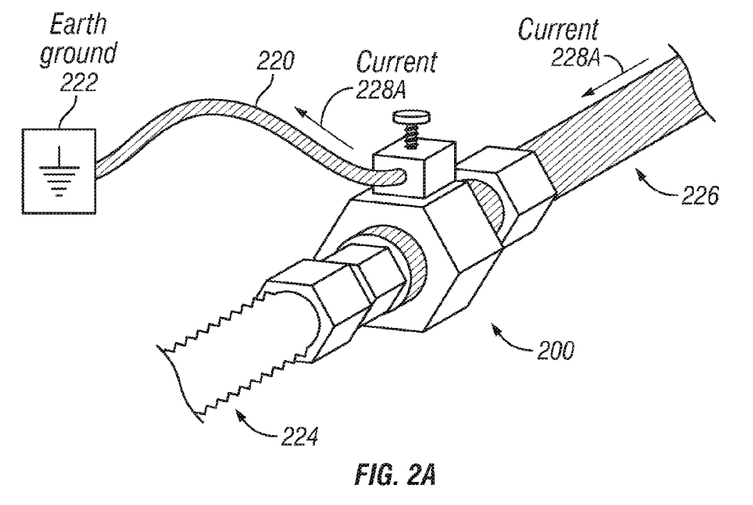
FIG. 2A illustrates the plumbing connector in operation with current traveling along a black iron pipe.
Figure 2B:
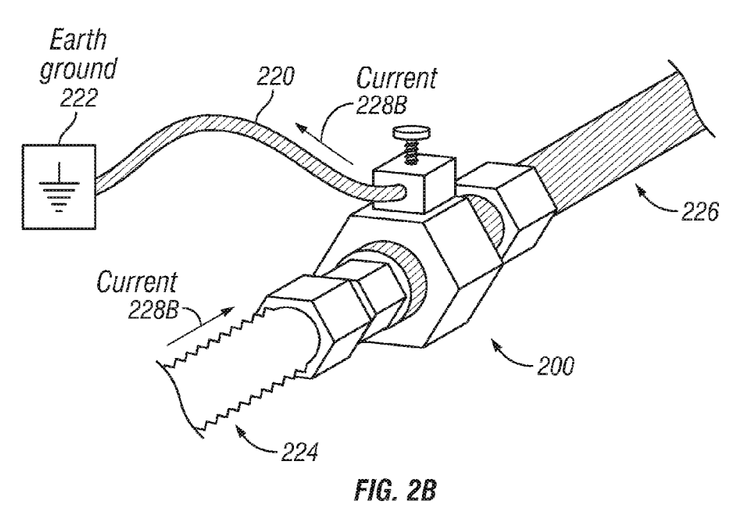
FIG. 2B illustrates the plumbing connector in operation with current traveling along a CSST pipe.

FIGS. 2A and 2B illustrate the threaded plumbing connector 200 in operation as the junction between a CSST pipe 224 and a black iron pipe 226. A high current s introduced along the pipes by some event, such inadvertent energization by household current. Utilizing the threaded plumbing connector 200 can prevent the current from passing to a second pipe from a first pipe. In FIG. 2A the current 228A is traveling towards the threaded plumbing connector 200 along the black iron pipe 226, and potentially traveling to the CSST pipe 224. Similarly in FIG. 2B the current 228B travels along the CSST pipe 224 towards the threaded plumbing connector 200. However, in both illustrations the threaded plumbing connector 200 connects via a wire 20 to the earth ground 222 of the building. The wire 220 to earth ground 222 provides a shunt to direct the current 228 away from the CSST pipe 224 or black iron pipe 226. In some cases the threaded plumbing connector 200 will be connected to the black iron pipe 226 through a traditional grounding clamp, however, the present invention in an exemplary embodiment is designed to prevent the requirement of this extra piece to create a ground connection.

Figure 3A:
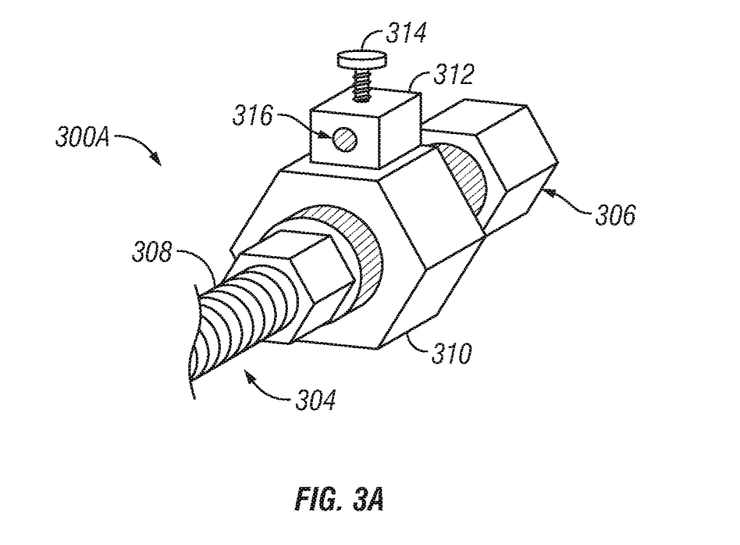
FIG. 3A shows a perspective view of the plumbing connector with CSST ready to attach and a first male end and a second female end.
Figure 3B:
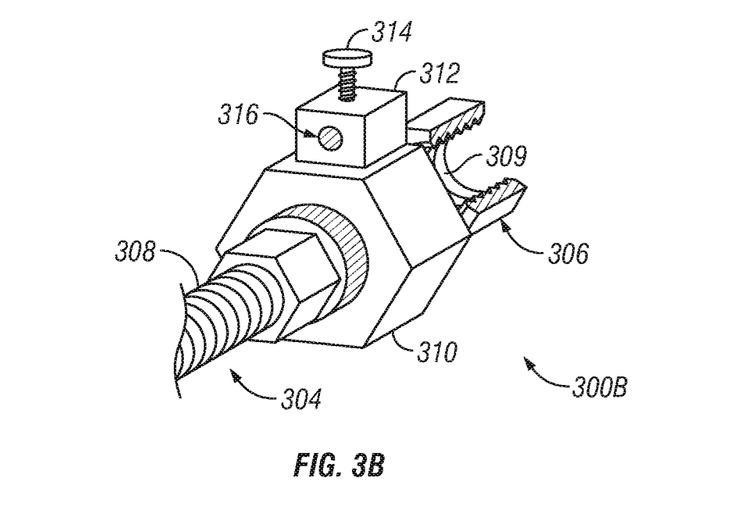
FIG. 3B shows a perspective view of the plumbing connector with a cut away view of the second female end.
Figure 3C:
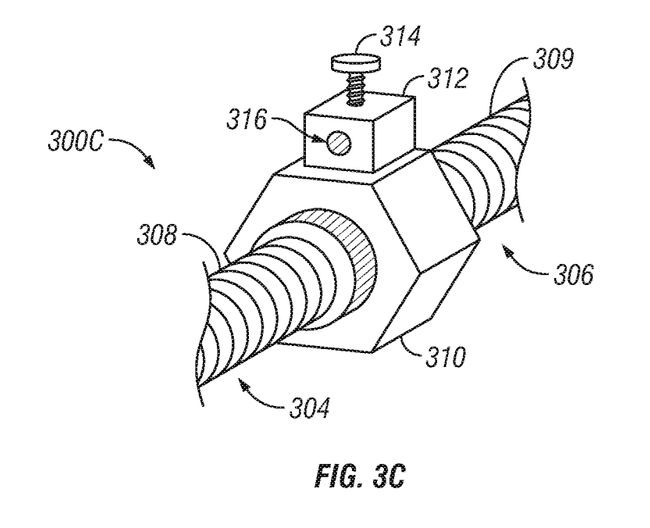
FIG. 3C shows a perspective view of the plumbing connector with a first and second male ends.

FIG. 3A-3C shows a perspective view of a threaded plumbing connector 300A, 300B, 300C. Fluid can pass through the threaded plumbing connector 300A, 300B, 300C, via the center of the hollow cylinder (not shown). The hollow cylinder is threaded on each end (304, 306), in order to fasten the hollow cylinder to a pipe (not shown), creating a first threaded end 304 and a second threaded end 306. Each of these threaded ends 304 and 306, also has their own unique thread pattern. The first threaded end 304 corresponds to a first thread pattern 308, and the second threaded end 306, corresponds to a second thread pattern 309. Between the first threaded end 304, and the second threaded end 306, is a protruded section 310 along the outer surface of the hollow cylinder. Attached to one section of the protruded section 310, is a wire terminal block 312. In the embodiment disclosed in 3A-3C, the wire terminal block 312, also includes a set screw 314. The terminal block 312, also has a feedthrough 316 for accepting a wire or other conductive material that the set screw 314 will secure in the feedthrough 316.

The set screw 314 ensures a connection between the wire terminal block 312 and a conductive material such as a wire that is within the feedthrough 316. However, the combination of the feedthrough 316, the set screw 314, and the wire terminal block 312 could alternatively be comprised of, for example, a spring-loaded terminal or a pressure fit terminal. In addition, the terminal block 312 could be a formed as one continuous piece with the threaded plumbing connector 300A, 300B, 300C, or affixed to the protruded section 310 through a conductive material. The cross-section shape of the protruded section 310 in the preferred embodiment would be hexagonal. However, the shape is not exclusive, for example the cross section of the protruded section 310, could also be a square, rectangle, or oval, or any other shape. Additionally the protruded section 310 could comprise multiple sections with each, having its own cross section shape. For example, a first protruded section having a first hexagon cross section, followed by a larger second protruded section 310 having a second hexagon cross section with the wire terminal block 312 attached, and finally a third protruded section that matches the cross section of the first protruded section.

In order to allow the wire terminal block 312, to transfer electrical current along a conductive material, the threaded plumbing connector 300A, 300B, 300C, should be made of an electrical conducting material. Alternatively, the threaded ends (304 and 306), and the wire terminal block 312 can be made of different electrically conductive materials to facilitate the transfer of electrical current from the threaded ends (304 and 306) to the wire terminal block 312. For example, the wire terminal block 312 would have a higher conductivity and lower resistance, than the threaded ends (304 and 306). The present invention is not limited, to being wholly made of an electrical conducting material, for example, if only the outer surface of the protruded section 310, the first threaded end 304 and the second threaded end 306 are made of an electrical conductive material the protection of the pipes can still be achieved. These pipes are the means for transferring fluid from a supply source (not shown) to a utilizing device, such as a water heater or furnace. To provide efficient fluid flow the shape and diameter of the hollow cylinder (not shown), can also be matched to the shape and diameter of the first and second pipe to provide an efficient transfer of fluid.

The first threaded end 304, and the second threaded end 306, provide the interface to shunt electrical current away from the fluid pipes, through the threaded pipe connector 300A, 300B, 300C and out through the wire terminal block 312, and the attached conductive material. The available surface area provided by the first threaded end 304, and the second threaded end 306, allow electrical current to be shunted away from fluid pipes; this is an important improvement over the current art. The available surface area is critical for the transferability of current away from the pipes. The first threaded end 304 can also have a first thread pattern 308. The matching of the first thread pattern 308, to that of the first pipe (not shown) is crucial to the effectiveness of the current shunting. This interface of materials is key to shunting current through the threaded pipe connector 300A, 300B, 300C and out through the wire terminal bock 312. The first threaded end 304 and the second threaded end 306 can include for example, flared fittings that reduce the need of Teflon tape, or plumbers putty to prevent leaks. This also increases the ability of threaded plumbing connector 300A, 300B, 300C to transfer electrical current efficiently because neither of these materials have a high conductivity. Similarly, the second threaded end 306 also has a second thread pattern 309, matching with the thread pattern of a second pipe (not shown), in order to shunt current through the threaded pipe connector 300A, 300B, 300C, and out through the wire terminal bock 312.

Figure 4:
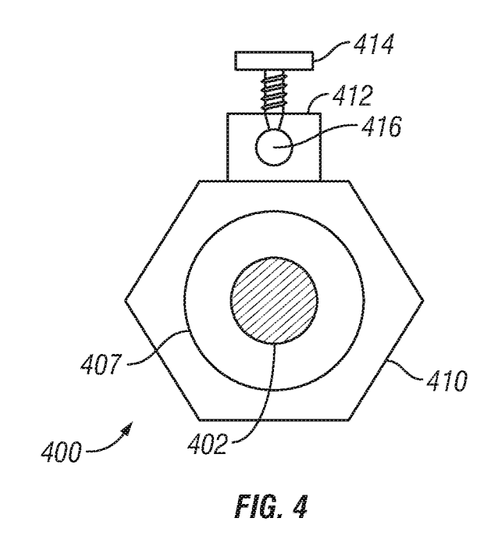
FIG. 4 illustrates a cross-sectional end view of the plumbing connector.

FIG. 4 illustrates a cross sectional end view of the threaded plumbing fitting 400. At the center of FIG. 4, is the hollow cylinder 402, for the transfer of the fluid from the first threaded end 304, to the second threaded end 306, or alternatively from the second threaded end 306 to the first threaded end 304. The thread pattern 407, of either the first thread pattern 308 of the first threaded end 304, or the second thread pattern 309 of the second threaded end 306 can been seen outside the hollow cylinder 402. The shape of the protruded section 410 can include a hexagonal shape, but it is not limited to this embodiment. For example, it could be a square, an oval, or rectangle, or any other polygon cross section that would al low a person to utilize a tool to affix the threaded plumbing fitting 400 to a pipe.

On one edge of the protruded section 410, is the wire terminal block 412. Through the center of e terminal block 412, is the feedthrough 416. The feedthrough 416 and set screw 414 allow for a connection between the wire terminal block 412 and the conductive material, such as a wire. The set screw 414 provides an adjustable fastener to lock a wire into the feedthrough 416, of the wire terminal block 412. The threaded plumbing connector 400 and the wire terminal block 412 in combination with a conductive material, in this example a wire (not shown), acts as a shunt for current traveling, along a pipe. It is preferable that the material of the wire terminal block 412 be the same material as the protruded section 410 however, this is not required as long as the material is low resistance and has a high conductivity. In addition, in the preferred embodiment, the first threaded end 304, the second threaded end 306, the outer surface of the hollow cylinder 402, and the wire terminal block 412, would be made of one solid piece of material. While in other embodiments the first threaded end 304, the second threaded end 306, the outer surface of the hollow cylinder 402, and the wire terminal block 412 could be formed together from different materials through welding, glue, or other fastening methods.

Furthermore, the thread pattern 407 could be internal (female) or external (male) of the hollow cylinder 402. In an external (male) embodiment, the valley of the threads would be along the hollow cylinder 402, and the point of the threads at the thread pattern 407. For an internal (female) thread pattern embodiment, the valley of the threads would at the thread pattern 407, and the point of the threads at the start of the hollow cylinder 402. The wall thickness from the internal surface of the hollow cylinder 402, to the start of the thread pattern will be approximately one hundredth (0.01) of an inch at a minimum similar to the thickness of CSST.

Figure 5A:
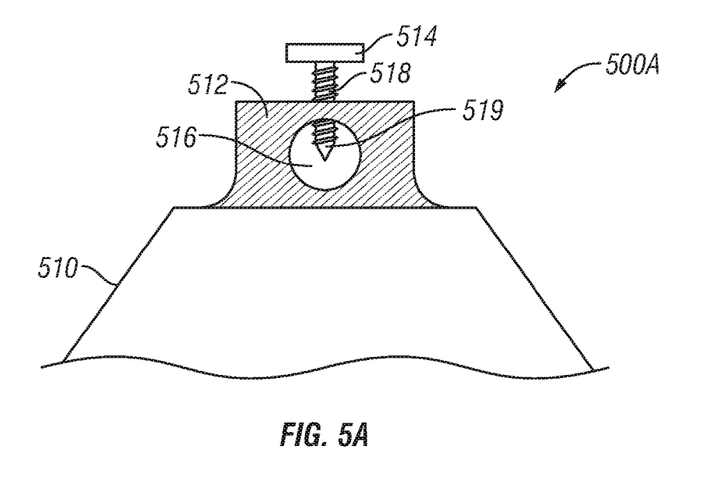
FIG. 5A shows an inset view of the wire terminal block.
Figure 5B:
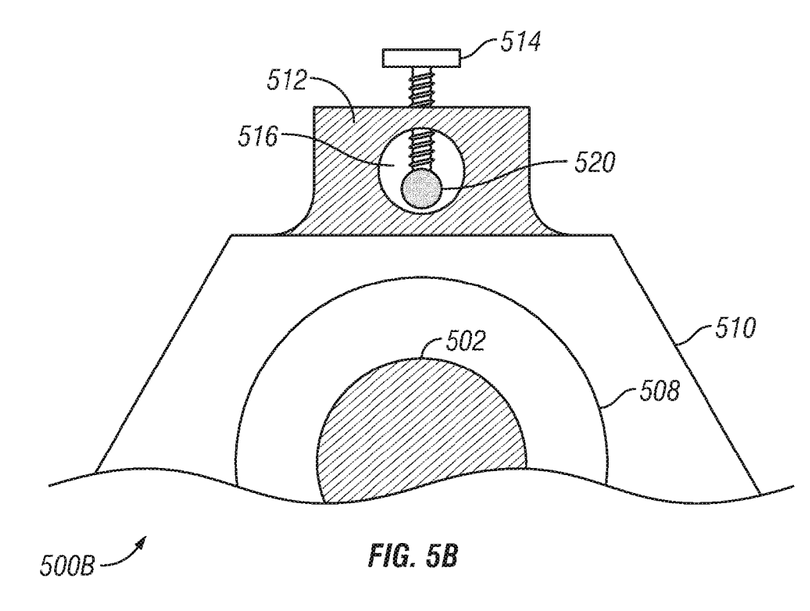
FIG. 5B shows an inset view of the wire terminal block, with the set screw connecting a wire conductor to the wire block.

FIGS. 5A and 5B show inset views of the wire terminal block of the threaded plumbing connector 500A and 500B. In FIG. 5A, the wire terminal block 512, and set screw 514, are shown in a ready positioning, prior to the fastening of a conductive material, such as a wire. As shown, the set screw 514 has a taper and a set screw thread pattern 518, in addition it can be the same material as the wire terminal block 512 and in some cases a non-conductive material would be preferable. However, the set screw 514 does not have to be limited to the same material as the wire terminal block 512. The shape and diameter of the feedthrough 516 can be set for a variety of standard conductive wire sizes.

FIG. 5B, provides a view of the wire terminal block 512, and the set screw 514, with a conductive wire 520 connected to the wire terminal block 512. The conductive wire 520, by National Fire Protection Association standards, must be 6 AWG or larger in order to handle the levels of current to help mitigate against lightning damage, This means that the feedthrough 516 must have a minimum diameter of seventeen hundredths (0.17) of an inch. The diameter would have to go up with the larger sizes of wire available as well. For example, 0 AWG is thirty-two hundredths (0.32) of an inch in diameter. In the preferred embodiment, the smaller feedthrough would start at one three sixteenths of an inch (3/16), in order to accommodate a 6 AWG wire.

Figure 6A:
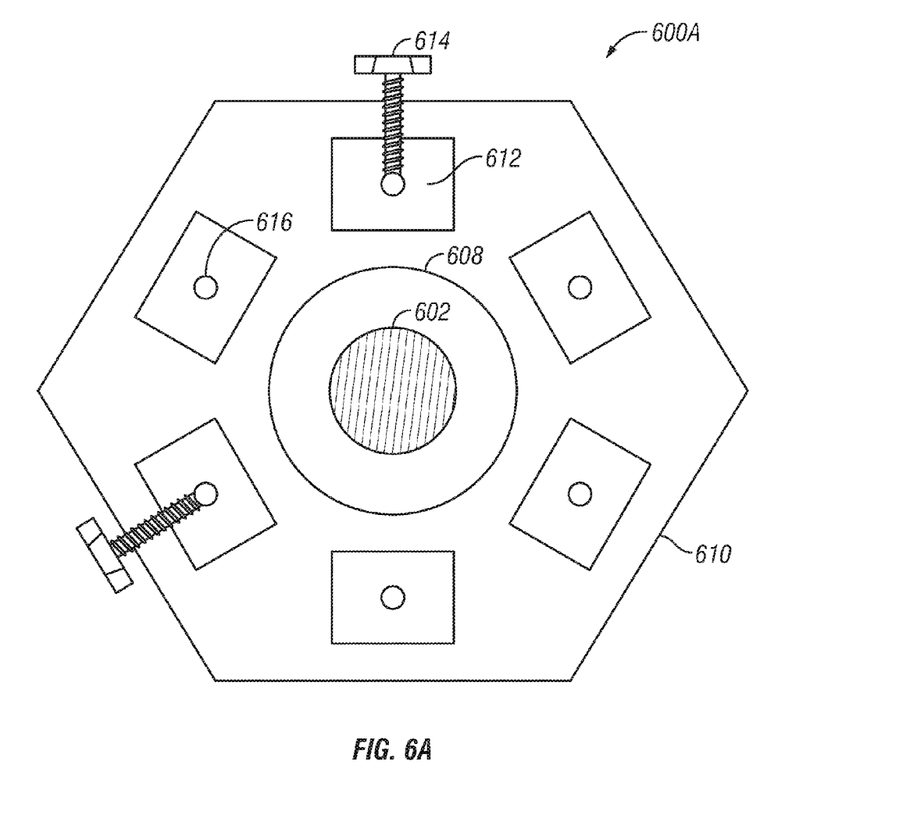
FIG. 6A illustrates a cross-sectional end view of a plumbing connector with a plurality of wire terminal blocks.
Figure 6B:
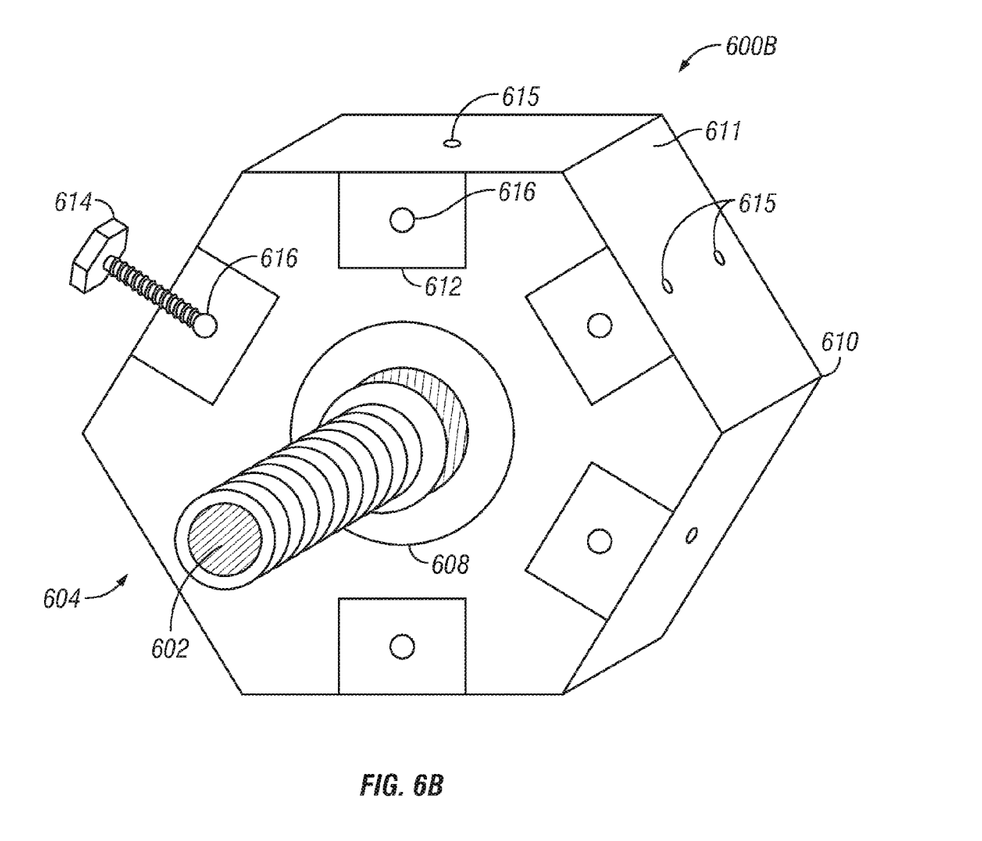
FIG. 6B shows a perspective view of the plumbing connector with a plurality of wire terminal blocks.

FIGS. 6A and 6B illustrate an alternative embodiment of the threaded plumbing connector 600A and 600B with a plurality of wire terminal blocks 612. FIG. 6A is a cross sectional view, and FIG. 6B is a perspective view. The wire terminal blocks 612, fill the space from the first thread pattern 608, and protruded section 610. Internal of the first thread pattern 608, is the hollow cylinder 602. The wire terminal blocks 612, allow a feedthrough 616, to run through the width or depth of the protruded section 610. A set screw 614 is used to secure a conductive wire (not shown) to the wire terminal blocks 612, through threaded bores 615. There can be a plurality of threaded bores 615, depending on the size of the pipe and the threaded plumbing connector 600B.

In this alternative embodiment, the wire terminal blocks 612 are internal of the protruded section 610 outer surface. By providing multiple wire terminal blocks 612, and enlarging the protruded section 610, the threaded plumbing connector 600A, 600B can serve as an electrical ground junction point and accommodate larger pipe sizes. Allowing installers to utilize the threaded plumbing connector 600A, 600B on additional types of pipe, for example black iron pipe that can run in size from an eighth (1/8) of an inch, all the way to twelve (12) inches.

This alternative embodiment also allows access to the wire terminal blocks 612 from any position of the threaded plumbing connector 600A, 600B. With multiple wire terminal blocks 612, this apparatus is reachable in many confined spaces without reducing its effectiveness. This alternative embodiment, also allows for the threaded plumbing connector 600A, 600B, to serve as a wire junction point to attach a first conductive wire, and a second conductive wire. The threaded plumbing connector 600A, 600B can be constructed of a single low resistance and high conductivity material or multiple low resistance and high conductivity materials.

Figure 7:
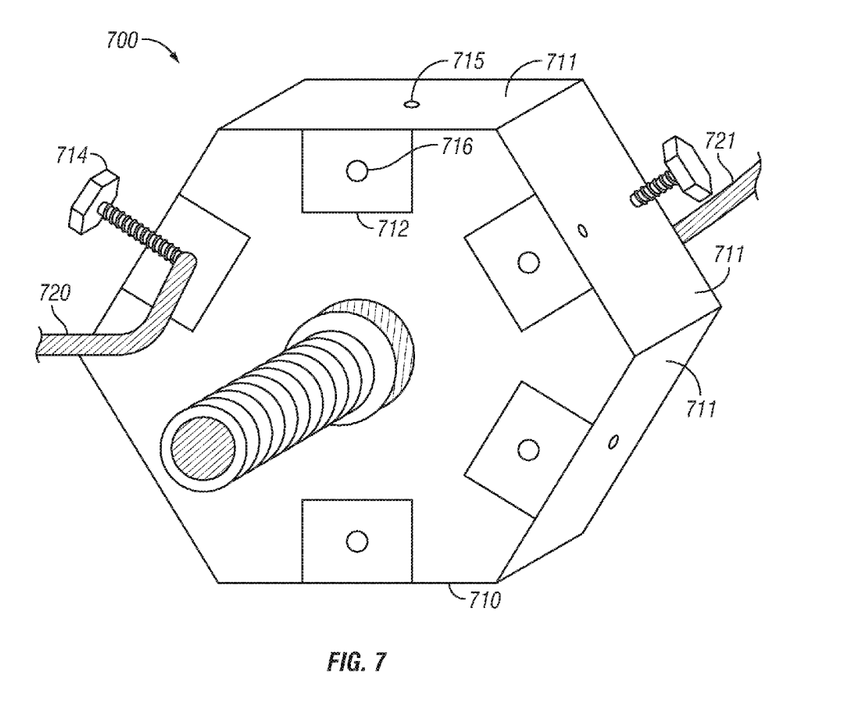
FIG. 7 illustrates the plumbing connector with a plurality of wire terminal blocks in operation.

FIG. 7 illustrates the threaded plumbing connector 700 with a plurality of wire terminal blocks 712 in operation. With the plurality of wire terminal blocks 712, the threaded plumbing connector 700 can also have multiple threaded bores 715 along outer face 711 of the protruded section 710. These threaded bores 715, allow the set screw 714 to connect the threaded plumbing connector 700, to the conductive wire 720 via the wire feedthrough 716 and the wire terminal blocks 712.

The threaded plumbing connector 700 can also act as a junction point for multiple conductive wires, for example, a first conductive wire 720 and a second conductive wire 721. For example, a gas line feeds a hot water heater, and a space heater, the ground wires for both of those individual gas lines could return to the threaded plumbing connector 700. Attaching to the plurality of wire terminal blocks 712, and then be attached to the main ground via a single wire, thereby reducing the number of wire run throughout a building, a very important issue in large-scale construction projects.

Figure 8A:
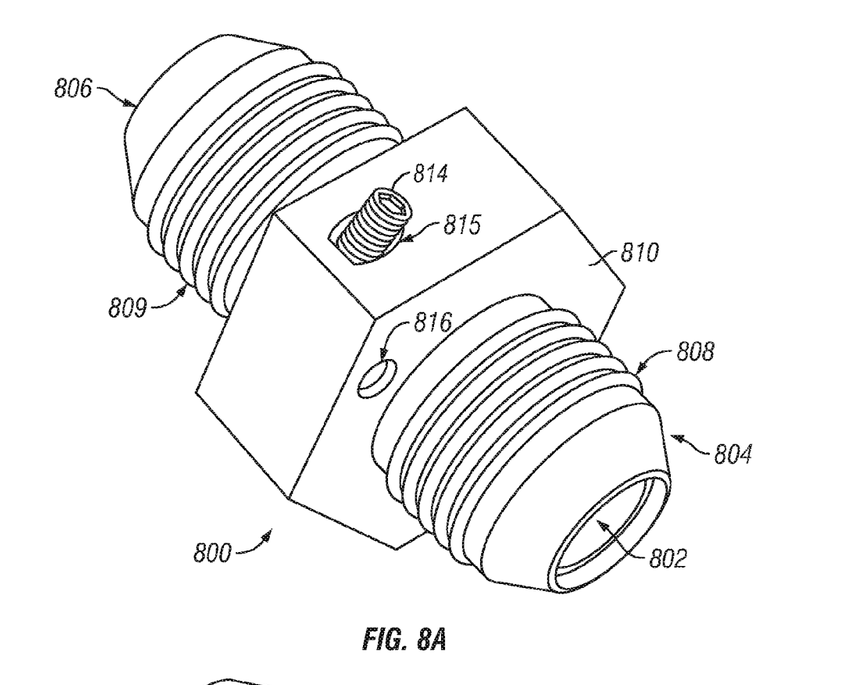
FIG. 8A illustrates the plumbing connector with an offset wire terminal connection.
Figure 8B:
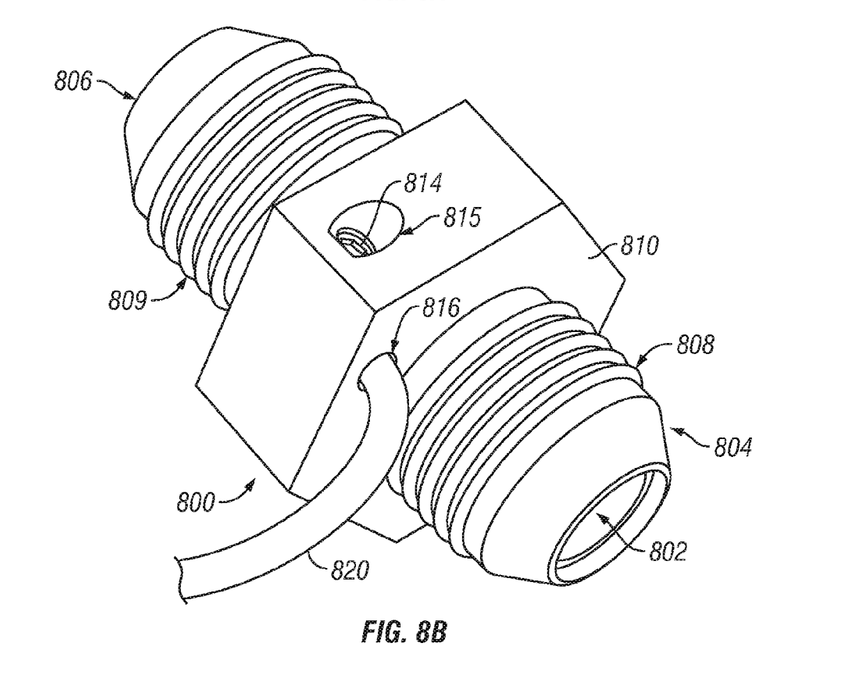
FIG. 8B shows the plumbing connector with an offset wire terminal connector connected to a wire.

FIGS. 8A and 8B illustrate the plumbing connector 800 in an unconnected state (FIG. 8A) and a connected state (FIG. 8B). Fluid, gas or other forms of liquid and gaseous mixtures can pass through the hollow cylinder 802. The hollow cylinder 802 has an outer surface comprised of a first end 804 and a second end 806, with a protruded section 810 interposed along the outer surface of the hollow cylinder 802 between the first end 804 and the second end 806. The first end 804, and second end 806 are illustrated as a male end, but are not limited to this illustration as the threaded ends 804/806 can also be female ends as well. The thread patterns, a first thread pattern 808 and a second thread pattern 809, can be, but are not limited to, course or fine threads to allow the threaded plumbing connector to attach to a plurality of plumbing fixtures and components. The protruded section 810 in the exemplary embodiment of the present invention illustrated has a feedthrough 816, wherein the feedthrough 816 is a bore running parallel to the fluid path through the hollow cylinder 802. The feedthrough 816 is also connected to a threaded bore 815 to allow a setscrew 814 to compress or attach a wire 820. The threaded bore 815 can be at a right angle to the feedthrough 816 or alternatively, as shown, be offset at an angle less than or greater than ninety degrees, It can be understood that there can be additional feedthroughs 816, threaded bores 815, and set-screws 814 along multiple surfaces of the protruded section 810. It is further noted that the fitting depicted in 800 is generically known as a male union adapter. Male union adapters are typically sold and used with Gas Appliance Connectors, GACS. The adapter 800 is used to adapt a flare fitting to Iron Pipe Thread, IPT. In that, GACs are very prone to damage caused by current damaging the flared ends, a pair of the male union adapters 800 can be utilized, one on each end of the GAC. A shunt wire of high conductivity can be inserted in the feedthrough 816 on each of the male union adapters 800. Should electrical fault current be travelling along a path from a gas appliance through the GAC and then black piping, the high conductivity shunt wire will keep a majority of the current off of the flared GAC fitting, thus deterring electrical damage.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A pipe connector, which comprises:
    a first end of a hollow cylinder, the first end of a hollow cylinder having a flared fitting;
    a second end of the hollow cylinder, distal from the first end, the second end of a hollow cylinder having a flared or black iron pipe fitting;
    a protruded section along an outer surface of the hollow cylinder, between the first end and the second end;
    a wire connection terminal, affixed to one or more of an outer surface of the protruded section;
    wherein the protruded section extends radially outward from the outer surface of the hollow cylinder along the entire circumference of the hollow cylinder; and
    wherein the first end is for fastening the hollow cylinder to a first pipe fitting, and the second end is for fastening the hollow cylinder to a second pipe fitting.

2. The pipe connector of claim 1, wherein a cross section of the protruded section is a hexagon.

3. The pipe connector of claim 1, wherein a cross section of the protruded section is a polygon.

4. The pipe connector of claim 1, wherein the first end is a first male thread pattern, and the second end is a second male thread pattern.

5. The pipe connector of claim 1, wherein the first end is a first female thread pattern, and the second end is a second female thread pattern.

6. The pipe connector of claim 1, wherein the first end is a male thread pattern, and the second end is a female thread pattern.

7. The pipe connector of claim 1, wherein the first end is a female thread pattern, and the second end is a male thread pattern.

8. The pipe connector of claim 1, wherein the wire connection terminal further comprises:
    a block of electrically conductive material;
    a hollow feedthrough through the block of electrically conductive material parallel in direction to the first end, and the second end;
    a threaded bore through the block of electrically conductive material perpendicular to the hollow feedthrough; and
    a fastener fit to said threaded bore.

9. The pipe connector of claim 8, wherein the pipe connector and the wire connector terminal are made of one continuous material.

10. The pipe connector of claim 1, wherein the hollow cylinder is made of brass.

11. The pipe connector of claim 1, wherein the hollow cylinder is made of steel.

12. The pipe connector of claim 1, wherein the hollow cylinder is made of an electrically conductive material.

13. A pipe connector, which comprises:
    a first end of a hollow cylinder, the first end of a hollow cylinder having a flared fitting;
    a second end of the hollow cylinder, distal from the first end, the second end of a hollow cylinder having a flared or black iron pipe fitting;
    an outer surface cylinder, wherein the outer surface cylinder has a protrusion;
    wherein the protrusion extends radially outward from the outer surface of the hollow cylinder along the entire circumference of the hollow cylinder; and
    a plurality of wire connection terminals within the protrusion.

14. The pipe connector of claim 13, wherein each of the plurality of wire connection terminals comprises:
    a hollow feedthrough parallel to the first threaded end, or the second threaded end;
    a threaded bore perpendicular to the hollow feedthrough; and
    a fastener fit to said threaded bore.

15. The pipe connector of claim 13, wherein a cross section of the protrusion is a hexagon.

16. The pipe connector of claim 13, wherein a cross section of the protrusion is a polygon.

17. The pipe connector of claim 13, wherein the first end is a first male thread pattern, and the second end is a second male thread pattern.

18. The pipe connector of claim 13, wherein the first end is a first female thread pattern, and the second end is a second female thread pattern.

19. The pipe connector of claim 13, wherein the first end is a male thread pattern, and the second end is a female thread pattern.

20. The pipe connector of claim 13, wherein the first end is a female thread pattern, and the second end is a male thread pattern.

21. A method of reducing current along a pipe comprising:
    (1) attaching a first pipe, the first pipe having a flared fitting, to a plumbing connector, the plumbing connector having a flared fitting corresponding to the flared fitting of the first pipe;
    (2) attaching a second pipe, the second pipe having a flared or black iron pipe fitting, to the plumbing connector, the plumbing connector having a flared or black iron pipe fitting corresponding to the flared or black iron pipe fitting of the second pipe;
    (3) connecting a wire to hollow feedthrough bored through the side of a protruded section of the hollow cylinder, wherein the protruded section extends radially outward from the outer surface of the hollow; and (4) shunting current away from said first pipe and said second pipe.

22. The method of reducing the current along the first pipe of claim 21, wherein the attaching step (1) further comprises attaching a female thread pattern of the first pipe to a first male thread pattern of the plumbing connector.

23. The method of reducing the current along the first pipe of claim 21, wherein the attaching step (1) further comprises attaching a male thread pattern of the first pipe to a first female thread pattern of the plumbing connector.

24. The method of reducing the current along the second pipe of claim 21, wherein the attaching step (2) further comprises attaching a female thread pattern of the second pipe to a second male thread pattern of the plumbing connector.

25. The method of reducing the current along the second pipe of claim 21, wherein the attaching step (2) further comprises attaching a male thread pattern of the second pipe to a second female thread pattern of the plumbing connector.

26. The method of reducing the current along the first and the second pipe of claim 21, wherein the shunting step (4) further comprises shunting the current away from said first and said second pipe, through the wire terminal block, and a wire attached to ground.

27. The method of reducing the current along the first and the second pipe of claim 21, wherein the connecting step (3) further comprises:

inserting the wire into the wire terminal block; and
securing the wire to the wire terminal block.

28. A pipe connector, which comprises:
a first end of a hollow cylinder, the first end of a hollow cylinder having a flared fitting;
a second end of the hollow cylinder, distal from the first end, the second end of a hollow cylinder having a black iron pipe fitting;
a protruded section along an outer surface of the hollow cylinder, between the first threaded end and the second threaded end;
a hollow feedthrough, the hollow feedthrough bored through one or more of the outer surface of the protruded section;
wherein the protruded section extends radially outward from the outer surface of the hollow cylinder along the entire circumference of the hollow cylinder; and
wherein the first end is for fastening the hollow cylinder to a first connection, and the second end is for fastening the hollow cylinder to a second connection.

29. The pipe connector of claim 28, wherein the protruded section further comprises a threaded bore connecting to the hollow feedthrough to the outer surface of the protruded section.

30. The pipe connector of claim 29, wherein the threaded bore is filled with a setscrew to pressure a wire within the feedthrough.

\* \* \* \* \*